United States Patent [19]
Lovmark

[11] 3,974,652
[45] Aug. 17, 1976

[54] DEVICE FOR CONVERTING WAVE ENERGY IN BODIES OF WATER

[76] Inventor: August Otto Lovmark, 8710 Cypress Ave., Cotati, Calif. 94928

[22] Filed: July 16, 1975

[21] Appl. No.: 596,442

[52] U.S. Cl.................................. 60/398; 60/413; 60/505; 60/506; 60/507; 417/332
[51] Int. Cl.² .................... F03G 7/00; F03G 7/08
[58] Field of Search ............................. 60/497–507, 60/398, 413; 417/331–333

[56] References Cited
UNITED STATES PATENTS

| | | | |
|---|---|---|---|
| 1,497,205 | 6/1924 | Boosinger | 60/505 |
| 2,848,189 | 8/1958 | Caloia | 60/505 |

*Primary Examiner*—Allen M. Ostrager
*Attorney, Agent, or Firm*—Warren, Chickering & Grunewald

[57] ABSTRACT

There is disclosed a device to convert water wave motion into useful energy which includes a shaft mounted to be rotatable and having fixed thereto a plurality of gears, a plurality of floats equal in number to the plurality of gears with each float connected by an arm, through a fulcrum, to a ratchet-like device on the other end of the arm from the float, which ratchet-like device drives one of the gears. The shaft drives a gear train which results in a rapidly rotating shaft which drives a pump which takes suction from a low pressure reservoir and discharges to drive a fluid-driven motor. Between the discharge side of the pump and the fluid-driven motor are a high pressure reservoir for the driving fluid, a regulating valve, and a pressure relief valve which discharges into the low pressure reservoir, whereby the action of waves in a body of water causes a continuous surge of fluid through the motor at a uniform pressure.

5 Claims, 5 Drawing Figures

DEVICE FOR CONVERTING WAVE ENERGY IN BODIES OF WATER

BACKGROUND OF THE INVENTION

The alarming depletion of irreplaceable fossil fuels has promoted a search for alternative energy sources. One large and inexhaustible source of energy is the wave motion in bodies of water, particularly ocean waves. Harnessing this large energy source is difficult because waves come in pulses and vary both in number and intensity from day to day, and indeed from hour to hour. Large users of energy, such as utility companies, require a constant and reliable source of energy, and as a consequence the energy of ocean waves has not been used.

THE INVENTION

This invention is a device for converting the energy in the waves in large bodies of water to other forms of energy which are more readily used. The device of this invention includes a shaft mounted on bearings and adapted to rotate and having fixed thereto a plurality of gears which are fixed to the shaft such that motion of the gears causes the shaft to rotate. The device also includes a number of floats positioned in a body of water so that the floats will rise and fall as waves pass beneath them. The number of floats is equal to the number of gears on the shaft, and each float is connected to one gear through an arm that passes over a fulcrum so that rising and falling of the float will produce a corresponding rising and falling of the other end of the arm but in the opposite direction. Thus, when the float rises, the opposite end of its arm will go through a falling motion and vice versa. Each of the arms is of a different length, and each of the fulcrums is positioned beneath the arm so the ratio of the arm's length between the fulcrum and the float to the arm's length between the fulcrum and the gear is the same for all arms.

The side of the arm opposite the side to which the float is fixed is provided with a one-directional drive means for turning the gear. A typical one-directional drive means is a ratchet arrangement, and although the invention is not limited to a ratchet, for convenience the one-directional drive means will be referred to hereinafter as a ratchet. Thus, rising and falling of the floats as waves pass beneath them will cause the ratchets to turn the gear wheels, or ratchet wheels, connected to the shaft. Additionally, since each arm is a different length, the floats will not go up and down in unison as a wave passes beneath them, but will rather go up and down serially so that a different float is turning the shaft at any given moment whereby a more continuous motion of the shaft is obtained. The ratio of arm length on either side of the fulcrum results in having the distance that the ratchet drives the ratchet wheel the same for any given wave height regardless of the length of the arms, and additionally produces the same force in driving the ratchet wheels regardless of the length of the arms.

The shaft is caused to rotate in one direction by the action of the waves, and it is connected to a pump through a train of large gears driving small gears. The gears are selected to drive the pump at an appropriate high speed, preferably between 200 and 400 rpm faster than the shaft turned by the ratchet. The pump is connected on its suction side to a low pressure reservoir for driving fluid. Preferably, the driving fluid is not water but rather a circulating inventory of oil which is lubricating, noncorrosive, and can be selected to have the proper properties for driving a motor. However, the low pressure reservoir of driving fluid may be the body of water itself when the water is employed as a driving fluid.

The discharge side of the pump is connected to a high pressure reservoir which in turn is connected to a fluid-driven motor. Preferably, a pressure control valve is employed in the high pressure reservoir to return excess fluid to the low pressure reservoir. Between the high pressure reservoir and the motor is a pressure regulating valve which is designed to pass high pressure fluid to the fluid-driven motor in regulating amounts.

The high pressure fluid reservoir preferably has a large capacity and is provided with an air cushion that can have regulated pressure, for example by being equipped with suitable pressure relief valves and a source of air under pressure, such as an auxiliary compressor.

DETAILED DESCRIPTION OF THE INVENTION

The invention may be better understood with reference to the accompanying drawings which illustrate devices embodying the invention.

Figure 1:
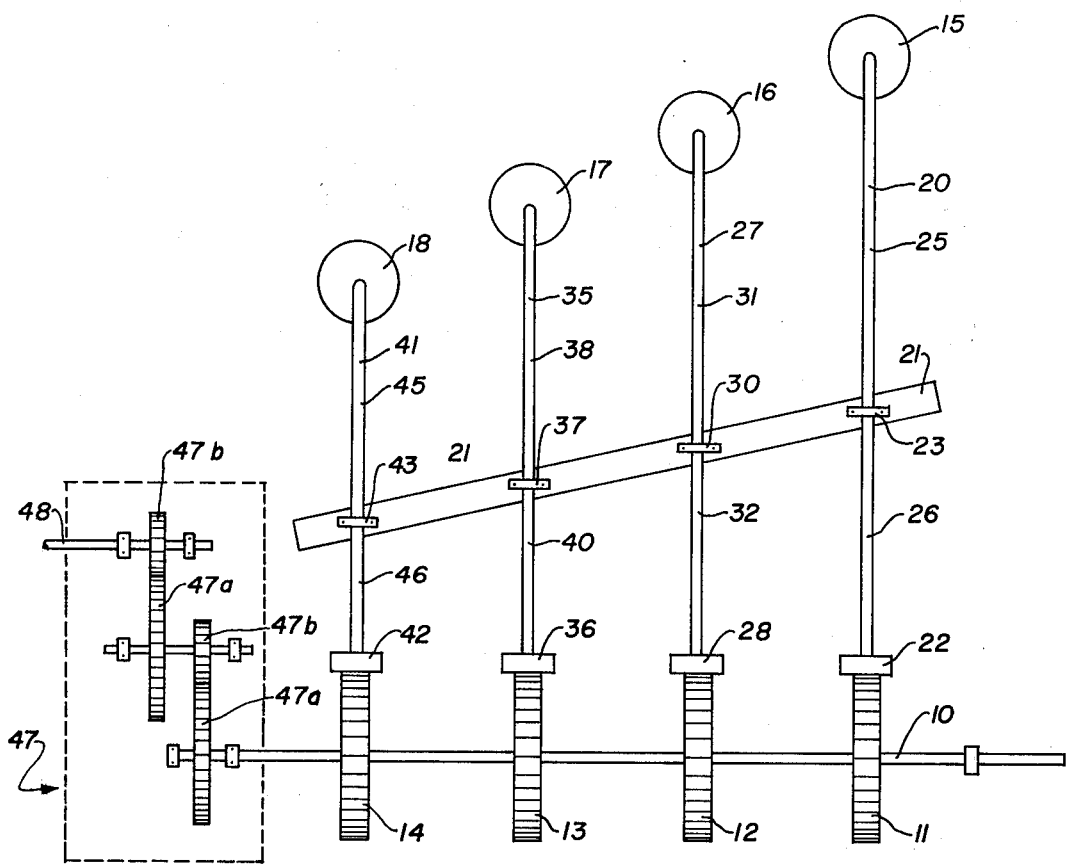
FIG. 1 illustrates that portion of the device of this invention employed to convert the wave action of a body of water through the rotary motion of a shaft.

FIG. 1 illustrates, without great attention to detail and engineering, the concept of that portion of the device of this invention that is employed to convert the oscillating motion of waves to rotary motion of a shaft. A shaft 10, which is suitably supported by bearings, not shown, is provided with a plurality of ratchet wheels 11, 12, 13 and 14 fixed to the shaft so that movement of the ratchet wheels will cause rotation of the shaft 10. Although only four ratchet wheels are shown on the shaft, it is evident that more or less may be employed. Floats 15, 16, 17 and 18 are associated, as will be explained hereinafter, with ratchet wheels 11, 12, 13 and 14 respectively. The float 15 is connected through the arm 20 over a fulcrum 21. The side of arm 20 opposite float 15 terminates in a ratchet driving means 22 which is shown generally and without detail. The arm 20 is held by a shackle 23 to fix it to the fulcrum 21. By this means, the arm 20 is divided by the shackle into an element 25 and an element 26.

Similarly, the float 16 is connected to drive ratchet wheel 12 via an arm 27, a ratchet drive 28 and a shackle 30 which divides the arm 27 into a segment 31 and a segment 32. Floats 17 and 18 are similarly arranged. Float 17 is connected through an arm 35 and a driving means 36 to ratchet wheel 13, and shackle 37 divides arm 35 into a segment 38 and a segment 40. While float 18 is connected through arm 41 and driving means 42 to ratchet wheel 14, shackle 43 divides the arm 41 into a segment 45 and a segment 46.

The shaft 10, as illustrated herein, terminates in a number of gears generally designated 47 which convert the rotational motion of shaft 10 to a rotational motion at a higher rate in shaft 48, which higher rate of rotation is adaptable to driving a pump. The gears 47 include two larger driving gears 47a and two smaller driven gears 47b which are arranged such that shaft 48 rotates 200 to 400 rpm faster than shaft 10.

In operation the shaft 10 is normally positioned parallel with the shoreline. Ordinarily the device of this invention will be positioned in a body of water and mounted on suitable piers to be above the body of water. The arms 20, 27, 35 and 41 may be shaped to drive the sprocket wheels even though they are positioned at a higher elevation than the floats 15 through 18 inclusive. The positioning of the various elements may be done in accordance with ordinary engineering techniques without involving invention. The fulcrum 21 is positioned at an angle with respect to the axis of the shaft 10 so that each of arms 20, 27, 35 and 41 will be supported by the fulcrum 21 a different distance from their respective sprocket wheels. The floats 15 through 18 inclusive are also arranged so that a line through their centers is at an angle to the axis of the shaft 10. In FIG. 1, an extension of the axis of the shaft 10, an extension of the fulcrum 21, and an extension of the line passing through the centers of each of floats 15 through 18 inclusive intersect at a point. Accordingly, the ratio of the lengths of segment 25 and 26 is the same as the ratio of the lengths of segments 31 and 32 and the ratio of the lengths of segments 38 and 40 and the ratio of the lengths of segments 45 and 46. Accordingly, regardless of the length of any of the arms 20, 27, 35 or 41, for a given size wave the travel of driving elements 22, 28, 36, and 42 will be the same, and the leverage urging the sprocket wheels to move will be the same. This arrangement of parts has the following advantages. By staggering the floats 15 through 18 inclusive, a single wave will not pass beneath all of them at the same time, and as a result, a wave passing from the body of water toward the shore will produce four pulses of motion in the shaft 10 rather than one. However, when staggering of floats has been done in the past, the longer arm floats would produce a pulse with different force and different travel on the sprocket wheel than a shorter-arm float so that uniform reaction from a wave was not obtained. In accordance with the structure of the present invention, when a wave of a given height passes beneath the floats, regardless of whether the float has a long arm or a short arm connecting it to its respective sprocket wheel, the force and travel of the sprocket wheel as a result of the wave motion will be the same regardless of which float actuates it.

Although the floats 15 through 18 inclusive are shown in a regular array going from the shortest arm to the longest arm from left to right, it is within the scope of this invention to position the longer arms and shorter arms randomly and to provide each arm with its own fulcrum so long as the ratio of the length of the segment between the fulcrum and the float to the length of the segment between the fulcrum and the sprocket wheel is the same for each arm. The arrangement of floats will be made in accordance with the prevailing conditions at any position. Thus, when waves normally come into shore parallel to the shoreline, the array as illustrated in FIG. 1 is suitable. If waves normally come in at an angle such that they intersect the shoreline in a motion from right to left, then the array shown in FIG. 1 is suitable. However, if waves normally approach the shoreline so that they intersect the shore from an angle from left to right, then the array as illustrated in FIG. 1 should be varied either by putting the longer arm floats to the left and the shorter arm floats to the right or by providing a more random positioning of the longer and shorter arm floats with each having its own fulcrum.

Figure 2:
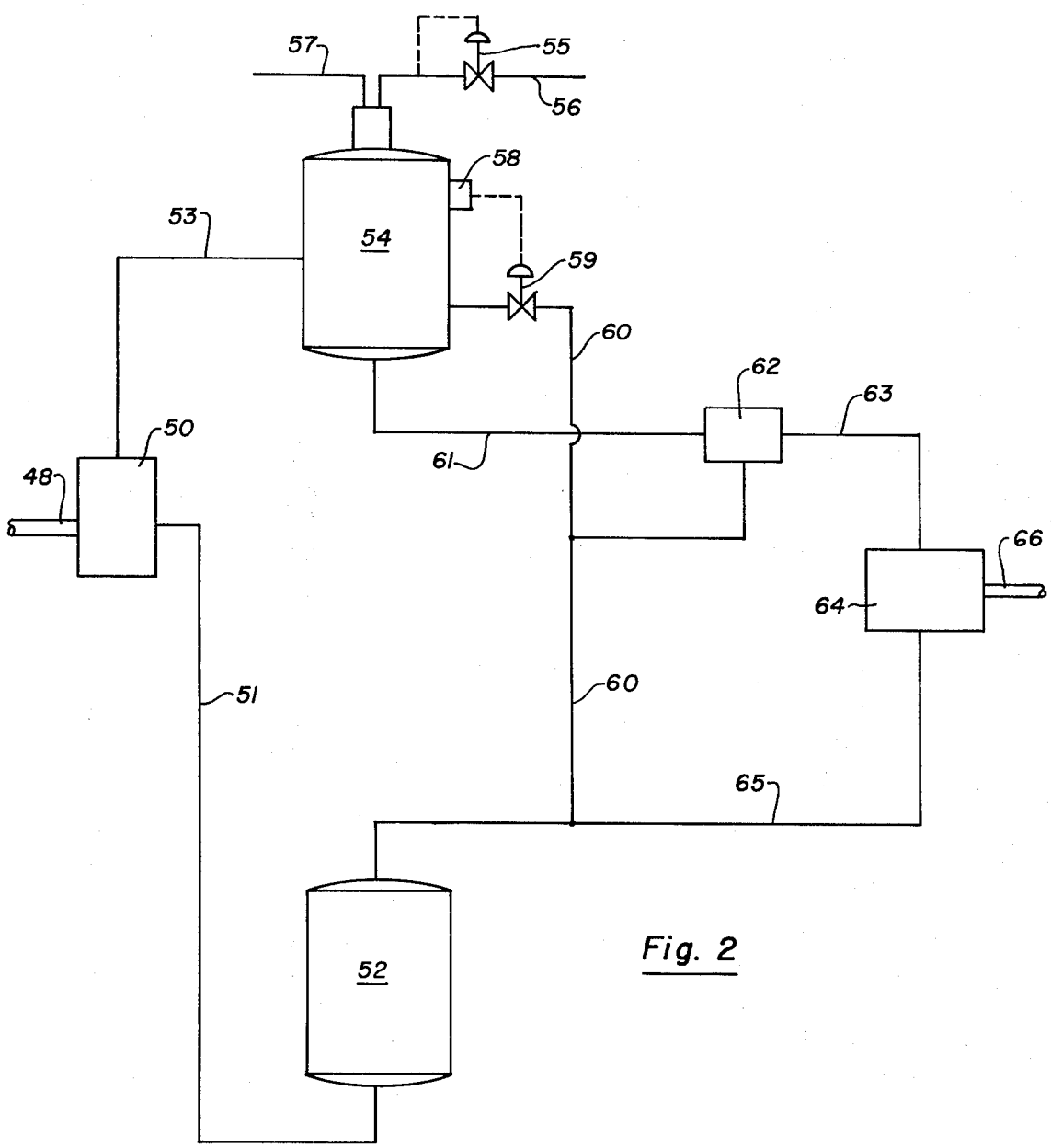
FIG. 2 illustrates that portion of the device of this invention wherein the irregular and pulsating rotary motion of the shaft illustrated in FIG. 1 is converted to the regular, uniform and continuous rotation of a shaft which is suitable for generating power or other uses.

FIG. 2 illustrates that portion of the device of this invention that deals with converting the rotational motion of the shaft 48 into a smooth, consistent and reliable source of energy. The shaft 48 will normally move with some pulsating motion, and it is connected to a pump 50 that is selected to be suitable to pump a driving fluid although it is actuated with pulsating motion from the shaft 48. The pump 50 takes suction through line 51 from a driving fluid although it is actuated with pulsating motion from the shaft 48. The pump 50 takes suction through line 51 from a driving fluid reservoir 52. Preferably, the driving fluid is selected to be suitable for its purpose and will usually be an oil having the proper viscosity, lubricity and resistance to deterioration. Although it is not preferred, the driving fluid may be the body of water itself, in which case a reservoir 52 would simply be the body of water.

In pump 50 the driving fluid is raised to a high pressure and discharged through the line 53 into high pressure reservoir 54. In reservoir 54, the fluid is maintained at the desired high pressure by an air cushion regulated with control valve 55 which vents air through line 56. Line 57 is connected to a compressor to restore air at the proper pressure to the upper part of reservoir 54. A level control means 58 operates valve 59 to release excess liquid from reservoir 54 and to return it to a reservoir 52 via line 60.

High pressure fluid from reservoir 54 passes through line 61 to a regulating valve 62 which regulates the flow of fluid through line 63 and to fluid driven motor 64. The fluid drives motor 64 and discharges from it at low pressure, passing through line 65 and returning to reservoir 52. Excess fluid is bypassed by valve 62 to flow directly back to reservoir 52. The shaft 66 driven by motor 64 provides regular, continuous, steady rotary motion for driving a device or for conversion into energy, for example if connected to an electric generator.

When the seas are high and shaft 48 rotates at a faster-than-normal rate, too much driving fluid will be pumped into line 53. When such is the case, driving fluid may accumulate in high pressure reservoir 54 where it is stored under high pressure as a source of potential energy to be employed when the seas are low and the rate at which pump 50 is operating is not sufficient to maintain the pressure in line 61.

The arrangement shown in FIG. 2 provides a smooth regular steady flow of driving fluid through the motor 64. A pulsating motion of shaft 48 causes driving fluid to be introduced into line 53 at an irregular rate. However, the irregularities in the flow are taken up by the air cushion and large capacity of high pressure reservoir 54 so that a constant supply of high pressure driving fluid is available in line 61. Regulating valve 62 will make slight adjustments in the degree that it is open or closed to accommodate for these small pulsations and will provide a flow at steady rate and steady pressure through the motor 64. To avoid damaging equipment and loss of fluid, the valve 57 is provided only to prevent building up damaging high liquid levels in the reservoir 54.

Figure 3:
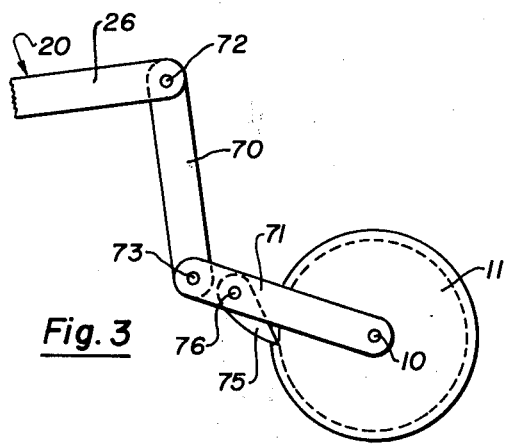
FIG. 3 illustrates one suitable ratchet wheel arrangment useful for converting the oscillating motion of the float to rotary motion of a shaft.
Figure 4:
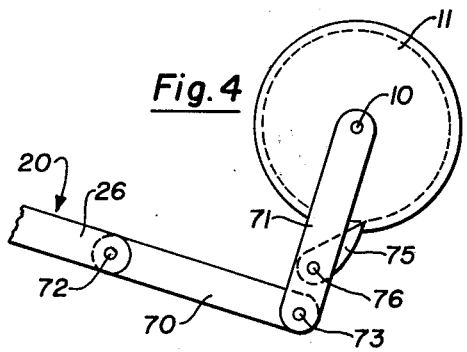
FIG. 4 illustrates the device of FIG. 3 in a different position.
Figure 5:
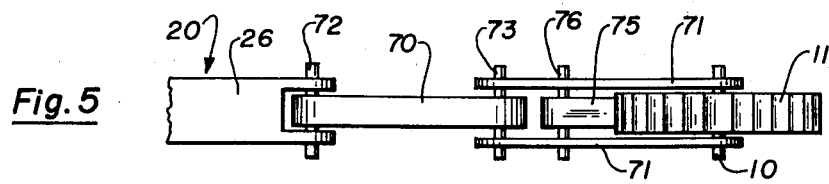
FIG. 5 illustrates the device of FIGS. 3 and 4 as viewed from above.

FIGS. 3, 4 and 5 illustrate a suitable ratchet arrangement for the ends of the float arms. FIG. 3 illustrates the float arm 20, in particular the end of segment 26. FIG. 3 illustrates the float arm 20 when the float 15 is in its lowermost position. The float arm 20 is connected through a link 70 to a pawl bearing link 71 which in turn is rotatably fixed to the shaft 10. A pin 72 connects link 70 to arm segment 26, and a pin 73 connects link 70 to the pawl bearing links 71 which are illustrated as being two in number. The pawl 75 is fixed with pin 76 beween the two pawl bearing links 71. The ratchet wheel 11 is shown without teeth for simplicity although it is evident that the ratchet wheel 11 will have conventional ratchet teeth in its surface that are suitably shaped to engage the pawl 75.

With the arrangement as shown, as the float goes from its lowermost position, as illustrated in FIG. 3, to its highest position, as illustrated in FIG. 4, the arm segment 26 swings through an arc. However, with the arrangement shown, the link 70 changes its angle with respect to arm segment 26 so that the pawl 25 may be driven through a substantial arc angle without losing contact with the ratchet wheel 11. In the uppermost position of the arm segment 26 its longitudinal axis may be substantially at right angles with the longitudinal axis of the link 70 while in the lowermost position of the arm segment 26, arm segment 26 and link 70 are substantially coaxial. Accordingly, the ratchet drive means illustrated herein causes the ratchet wheel 11 to be rotated through a significant angle for each cycle of the arm 20.

It is evident that many equivalent structures may be made within the broad scope of this invention.

What is claimed is:

1. A device to convert the motion of waves in a body of water to other forms of energy comprising:
    A. a shaft adapted to rotate and having fixed thereto a plurality of unidirectional rotating means;
    B. a plurality of floats equal in number to said plurality of rotating means with each float connected by an arm to a fulcrum and having on the other side of said arm from said float a driving means for said unidirectional rotating means, with the arms connected to said floats being of different lengths and positioned so that the ratio of the length of each arm between said float and said fulcrum to the length of said arm between said fulcrum and said driving means is the same for each arm, and with each of said driving means connected to rotate one rotating means;
    C. a pump driven by said shaft and connected on its suction side to a low pressure reservoir for driving fluid and on its discharge side to a pressure fluid reservoir; and
    D. A fluid-carrying line connecting said high pressure fluid reservoir to a flow control valve which distributes fluid to a fluid-driven motor and diverts excess driving fluid to said low pressure reservoir.

2. The device of claim 1 wherein the centers of all of said floats lie on a line, and said line is not parallel to the shoreline of said body of water.

3. The device of claim 1 wherein a single fulcrum structure is the fulcrum for all of said arms, and the longitudinal axis of said fulcrum structure is not parallel to the shoreline of said body of water.

4. The device of claim 1 wherein each of said rotating means is a ratchet wheel and wherein said drive means comprises a pawl-bearing link rotatably connected to said shaft and having attached thereto a pawl positioned to engage said ratchet wheel, said pawl-bearing link rotatably connected to a link and said link rotatably connected to said arm.

5. The device of claim 1 wherein the pressure of fluid in said high pressure reservoir is regulated and maintained at a higher pressure than the fluid passing to said fluid-driven motor.

* * * * *

UNITED STATES PATENT OFFICE
CERTIFICATE OF CORRECTION

PATENT NO. : 3,974,652

DATED : August 17, 1976

INVENTOR(S) : AUGUST OTTO LOVMARK

It is certified that error appears in the above-identified patent and that said Letters Patent are hereby corrected as shown below:

Column 2 line 15, change "regulating" to --regulated--.

Column 2 line 54, change "the," second occurrence, to --an--.

Column 6 line 15, after the word "a" add --high--.

Signed and Sealed this

Ninth Day of November 1976

[SEAL]

Attest:

RUTH C. MASON
Attesting Officer

C. MARSHALL DANN
Commissioner of Patents and Trademarks